US012743472B2

(12) United States Patent
Malak et al.

(10) Patent No.: US 12,743,472 B2
(45) Date of Patent: Sep. 22, 2026

(54) SYSTEM AND METHOD FOR ENRICHMENT OF DATA FROM EXTERNAL WEB SOURCES USING A LARGE LANGUAGE MODEL

(71) Applicant: ORACLE INTERNATIONAL CORPORATION, Redwood Shores, CA (US)

(72) Inventors: Michael Malak, Sarasota, FL (US); Brandon Tomooka, Anaheim, CA (US); Nigel Baldwin, Reading (GB); Monisha Balaji, Redwood Shores, CA (US); Kalyan Beemanapalli, Danville, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 19/095,871

(22) Filed: Mar. 31, 2025

(65) Prior Publication Data

US 2026/0064782 A1 Mar. 5, 2026

Related U.S. Application Data

(60) Provisional application No. 63/690,563, filed on Sep. 4, 2024.

(51) Int. Cl.
*G06F 16/951* (2019.01)
*G06F 16/22* (2019.01)

(52) U.S. Cl.
CPC .......... *G06F 16/951* (2019.01); *G06F 16/221* (2019.01)

(58) Field of Classification Search
CPC .................................................... G06F 16/951
See application file for complete search history.

(56) References Cited

U.S. PATENT DOCUMENTS

2021/0011891 A1 1/2021 Soza
2024/0126775 A1 4/2024 Shmulyan
(Continued)

FOREIGN PATENT DOCUMENTS

WO 2016049460 3/2016

OTHER PUBLICATIONS

European Patent Office, Notification of Transmittal of The International Search Report and The Written Opinion of The International Search Authority, or The Declaration dated Dec. 15, 2025 for International Application No. PCT/US2025/044719 , 16 pages.
(Continued)

*Primary Examiner* — Van H Oberly
(74) *Attorney, Agent, or Firm* — TUCKER ELLIS LLP

(57) ABSTRACT

Embodiments described herein are generally related to data analytics environments, and are particularly directed to systems and methods for use with a data analytics environment to provide enrichment of data from external sources via a large language model. In accordance with an embodiment, the systems and methods can utilize a high-powered LLM to suggest data-related factors that may not be explicitly represented in the user's dataset. For example, upon a user's selection of a pair of datapoints, the systems and methods can utilize a LLM to provide suggestions for root causes of those datapoints, even though such root causes are not explicitly represented in the dataset.

20 Claims, 16 Drawing Sheets

(56) References Cited

U.S. PATENT DOCUMENTS

| | | | | |
|---|---|---|---|---|
| 2024/0160953 | A1 * | 5/2024 | Manda | G06F 16/5846 |
| 2024/0202464 | A1 * | 6/2024 | Poirier | G06N 3/045 |

OTHER PUBLICATIONS

Lu, Weizheng et al. "Large Language Model for Table Processing: A Survey"; Front. Comput. Sci., 2024, pp. 1-26, arxiv.org; Cornell University Library, 201 Olin Library Cornell University, Ithaca, NY. 26 pages.

Plantinga, Femke; Slocum, Victoria "Chunking Strategies to Improve Your RAG Performance"; Sep. 4, 2025; Weaviate; 26 pages; retrieved Apr. 16, 2026 from: <https://weaviate.io/blog/chunking-strategies-for-rag>.

Kutumbe, Kshitij "Comprehensive Guide to Chunking in LLM and RAG Systems"; Sep. 4, 2024; Medium; 15 pages; retrieved Apr. 16, 2026 from: <https://kshitijkutumbe.medium.com/comprehensive-guide-to-chunking-in-llm-and-rag-systems-c579a11ce6e2>.

Vasan, Rini "LLM Chunking: How to Improve Retrieval & Accuracy at Scale"; Jun. 20, 2025; Redis; 9 pages; retrieved Apr. 16, 2026 from: <https://redis.io/blog/llm-chunking/>.

Debu-Sinha "The Ultimate Guide to Chunking Strategies for RAG Applications with Databricks"; Apr. 3, 2025; Databricks Technical Blog; 61 pages; retrieved Apr. 16, 2026 from: <https://community.databricks.com/t5/technical-blog/the-ultimate-guide-to-chunking-strategies-for-rag-applications/ba-p/113089>.

Bhavsar, Pratik "Mastering RAG: Advanced Chunking Techniques for LLM Applications"; Feb. 23, 2024; Galileo; 21 pages; retrieved Apr. 16, 2026 from: <https://galileo.ai/blog/mastering-rag-advanced-chunking-techniques-for-llm-applications>.

Kihm, Alexander "The Ultimate Guide to RAG Chunking Strategies & Text Splitters"; POMA AI; 12 pages; retrieved Apr. 16, 2026 from: <https://www.poma-ai.com/docs/rag-chunking-strategies-text-splitters?gad_source=1&gad_campaignid=23618792095&gbraid=0AAAABCR6gSQkZTChDKdXOO56OhKOHWKKp&gclid=EAIalQobChMI3pXTh4nzkwMVwCmtBh34FAIMEAMYASAAEgKTFPD_BwE#recursivecharactertextsplitter-limitations-.

* cited by examiner

SYSTEM AND METHOD FOR ENRICHMENT OF DATA FROM EXTERNAL WEB SOURCES USING A LARGE LANGUAGE MODEL

CLAIM OF PRIORITY AND CROSS-REFERENCE TO RELATED APPLICATIONS

This application claims the benefit of priority to U.S. Provisional Patent Application titled "SYSTEM AND METHOD FOR ENRICHMENT OF DATA FROM EXTERNAL WEB SOURCES USING A LARGE LANGUAGE MODEL", Application No. 63/690,563, filed Sep. 4, 2024, which above application and the contents thereof are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to data analytics environments, and to systems and methods for use with a data analytics environment to provide enrichment of data from external web sources using a large language model.

BACKGROUND

Generally described, data analytics enables the computer-based examination of an amount of data, to derive an analytic data, metrics, conclusions, or other types of analytical information from, or descriptive of, the source data. Systems and methods can be used, for example, to generate an analytic business intelligence data, such as a set of data metrics or measures operating as key performance indicators, which analytically describe an organization's business-related data in a format useful to its decision-makers.

SUMMARY

Embodiments described herein are generally related to data analytics environments, and are particularly directed to systems and methods for use with a data analytics environment to provide enrichment of data from external sources via a large language model. In accordance with an embodiment, the systems and methods can utilize a high-powered LLM to suggest data-related factors that may not be explicitly represented in the user's dataset. For example, upon a user's selection of a pair of datapoints, the systems and methods can utilize a LLM to provide suggestions for root causes of those datapoints, even though such root causes are not explicitly represented in the dataset.

DETAILED DESCRIPTION

Generally described, within an organization, data analytics enables computer-based examination of large amounts of data, for example to derive conclusions or other information from the data. For example, business intelligence (BI) tools can be used to provide users with business intelligence describing their enterprise data, in a format that enables the users to make strategic business decisions.

Increasingly, data analytics can be provided within the context of enterprise software application environments, such as, for example, an Oracle Fusion Applications environment; or within the context of software-as-a-service (SaaS) or cloud environments, such as, for example, an Oracle Analytics Cloud or Oracle Cloud Infrastructure environment; or other types of analytics application or cloud environments.

Examples of data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.

Cloud Infrastructure Environments

Figure 1:
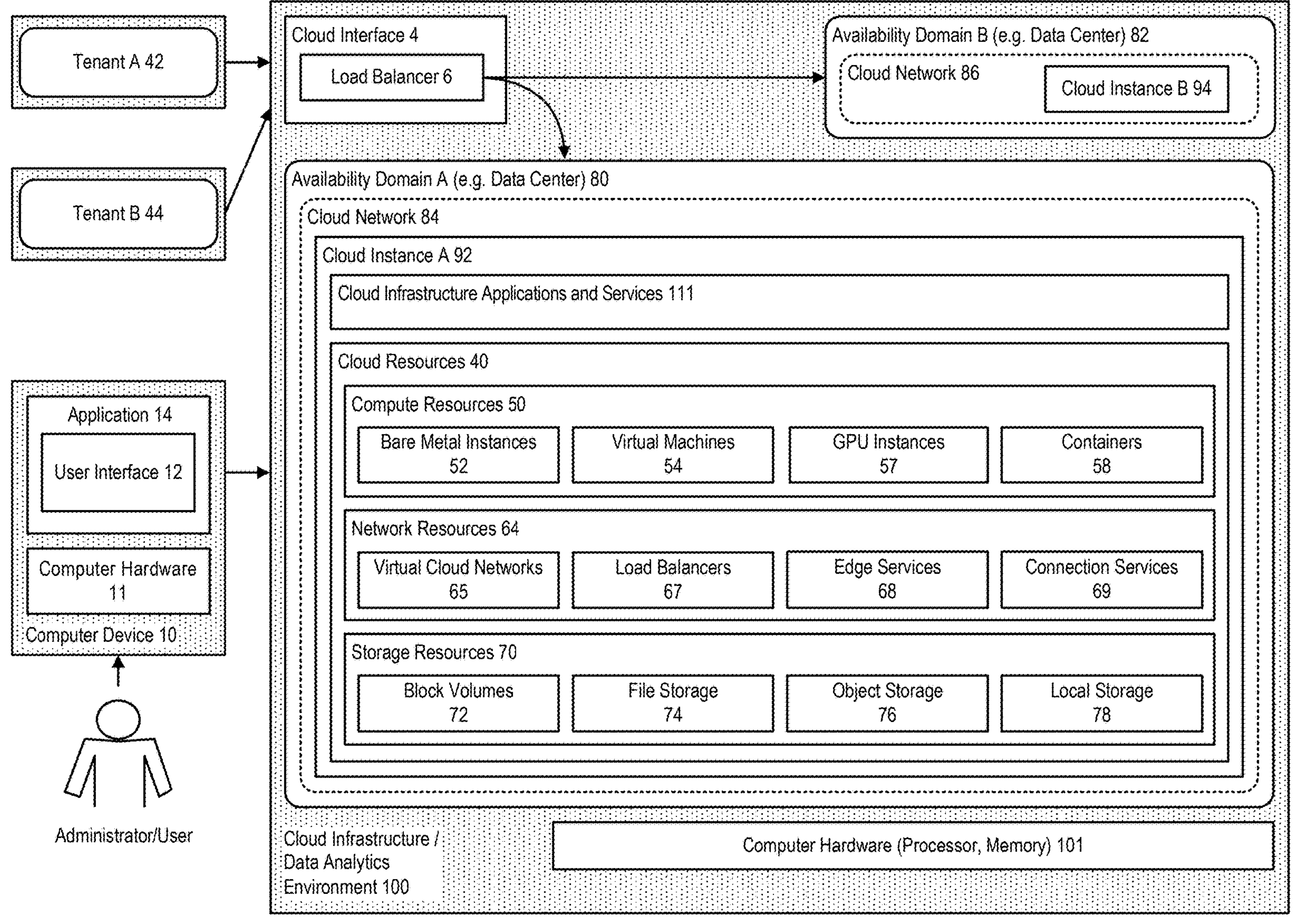
FIG. 1 illustrates a system for providing a cloud infrastructure or data analytics environment, in accordance with an embodiment.
Figure 2:
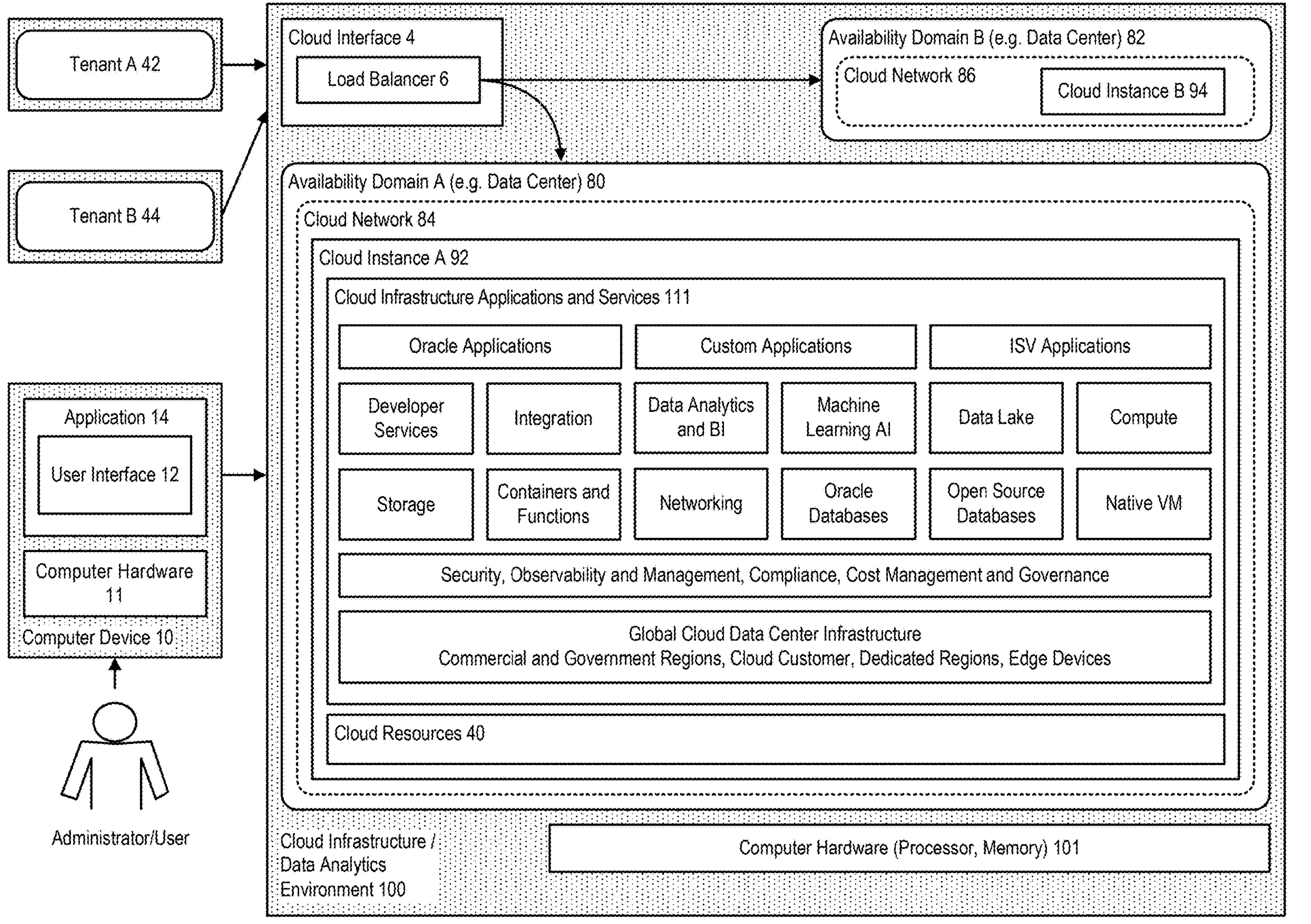
FIG. 2 further illustrates a system for providing a cloud infrastructure or data analytics environment, in accordance with an embodiment.

FIGS. 1 and 2 illustrate a system for providing a cloud infrastructure or data analytics environment, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system, or other suitably-programmed computer system.

The illustrated example is provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure or data analytics environment 100 can operate on a cloud computing infrastructure 101 comprising hardware (e.g., processor, memory), software resources, and one or more cloud interfaces 4 or other application program interfaces (API) that provide access to the shared cloud resources via one or more load balancers 6.

In accordance with an embodiment, the cloud infrastructure environment supports the use of availability domains, such as, for example, availability domains A 80, B 82, which enables customers to create and access cloud networks 84, 86, and run cloud instances A 92, B 94.

In accordance with an embodiment, a tenancy can be created for each cloud tenant/customer, for example tenant A 42, B 44, which provides a secure and isolated partition within the cloud infrastructure environment within which the customer can create, organize, and administer their cloud resources. A cloud tenant/customer can access an availability domain and a cloud network to access each of their cloud instances.

In accordance with an embodiment, a client device, such as, for example, a computing device 10 having a device hardware 11 (e.g., processor, memory), application 14 and graphical user interface 12, can enable an administrator other user to communicate with the cloud infrastructure environment via a network such as, for example, a wide area network, local area network, or the Internet, to create or update cloud services.

In accordance with an embodiment, the cloud infrastructure environment provides access to shared cloud resources 40 via, for example, a compute resources layer 50, a network resources layer 64, and/or a storage resources layer 70. Customers can launch cloud instances as needed, to meet compute and application requirements. After a customer provisions and launches a cloud instance, the provisioned cloud instance can be accessed from, for example, a client device.

In accordance with an embodiment, the compute resources layer can comprise resources, such as, for example, bare metal cloud instances 52, virtual machines 54, graphical processing unit (GPU) compute cloud instances 57, and/or containers 58. The compute resources layer can be used to, for example, provision and manage bare metal compute cloud instances, or provision cloud instances as needed to deploy and run applications, as in an on-premises data center.

For example, in accordance with an embodiment, the cloud infrastructure environment can provide control of physical host (bare metal) machines within the compute resources layer, which run as compute cloud instances directly on bare metal servers, without a hypervisor.

In accordance with an embodiment, the cloud infrastructure environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the network resources layer can comprise a number of network-related resources, such as, for example, virtual cloud networks (VCNs) 65, load balancers 67, edge services 68, and/or connection services 69.

In accordance with an embodiment, the storage resources layer can comprise a number of resources, such as, for example, data/block volumes 72, file storage 74, object storage 76, and/or local storage 78.

In accordance with an embodiment, the cloud environment can include a container orchestration system, and container orchestration system API, that enables containerized application workflows to be deployed to a container orchestration environment, for example a Kubernetes (k8s) cluster.

For example, in accordance with an embodiment, the cloud environment can be used to provide containerized compute cloud instances within the compute resources layer, and a container orchestration implementation (e.g., Oracle Cloud Infrastructure Container Engine for Kubernetes (OKE)), can be used to build and launch containerized applications or cloud-native applications, specify compute resources that the containerized application requires, and provision the required compute resources.

As illustrated in FIG. 2, in accordance with an embodiment, the cloud infrastructure or data analytics environment can include a range of complementary cloud-based components, for example as cloud infrastructure applications and services 111, that enable organizations or enterprise customers to operate their applications and services in a highly-available hosted environment.

By way of example, in accordance with an embodiment, a self-contained cloud region can be provided as a complete, e.g., Oracle Cloud Infrastructure (OCI) dedicated region within an organization's data center that offers the data center operator the agility, scalability, and economics of a public cloud, while retaining full control of their data and applications to meet security, regulatory, or data residency requirements.

Data Analytics Environments

Figure 3:
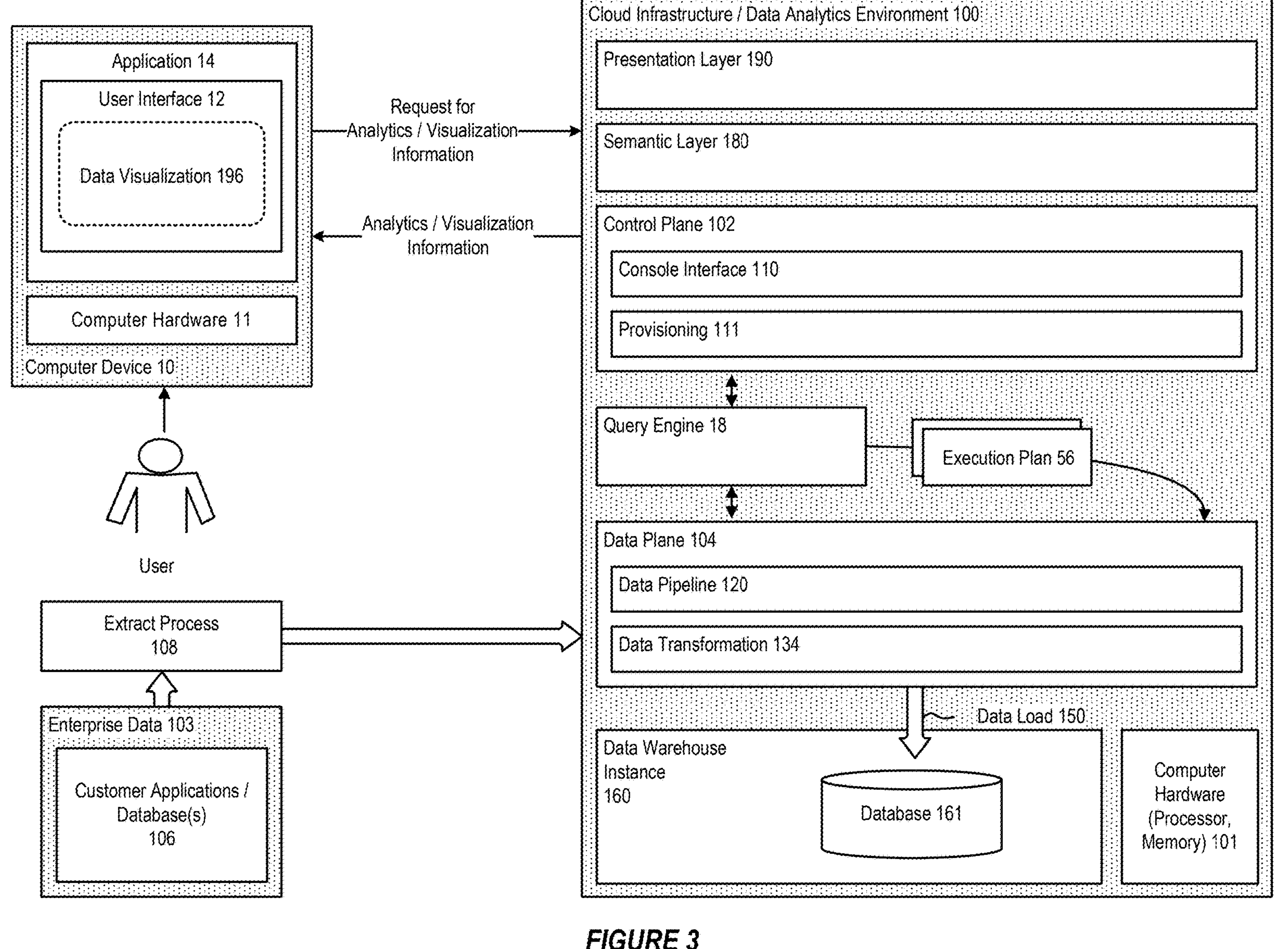
FIG. 3 illustrates an example use of the system to provide a data analytics environment, in accordance with an embodiment.

FIG. 3 illustrates an example use of the system to provide a data analytics environment, in accordance with an embodiment.

The example embodiment illustrated in FIG. 3 is provided for purposes of illustrating an example of a data analytics environment in association with which various embodiments described herein can be used. In accordance with other embodiments and examples, the approach described herein can be used with other types of data analytics, database, or data warehouse environments.

As illustrated in FIG. 3, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access in the manner of a data layer 270 to a data warehouse instance 160 (e.g., having a database 161, or other type of data source).

In accordance with an embodiment, the control plane operates to provide control for cloud or other software products offered within the context of a cloud environment. For example, in accordance with an embodiment, the control plane can include a console interface 110 that enables access by a customer (tenant) and/or a cloud environment having a provisioning component 111, for example to allow customers to provision services for use within their enterprise environment. The provisioning component can provision a data warehouse instance, including a customer schema of the data warehouse; and populate the data warehouse instance with the appropriate information supplied by the customer.

In accordance with an embodiment, the data plane can include a data pipeline or process layer 120 and a data transformation layer 134, that together process data from an organization's enterprise software environment, and load a transformed data into the data warehouse. The data transformation layer can include a data model, such as, for example, a knowledge model (KM), or other type of data model, that the system uses to transform the data received from business applications and corresponding databases, into a model format understood by the data analytics environment. The data plane is responsible for performing extract, transform, and load (ETL) operations, including extracting data from an organization's enterprise software environment, transforming the extracted data into a model format, and loading the transformed data into a customer schema of the data warehouse.

For example, in accordance with an embodiment, each customer (tenant) of the environment can be associated with their own customer schema; and can be additionally provided with read-only access to the data analytics schema, which can be updated by a data pipeline or process, for example, an ETL process, on a periodic or other basis. For example, a data pipeline or process can be scheduled to execute at intervals (e.g., hourly/daily/weekly) to extract enterprise data 103 from an enterprise software environment, such as, for example, business productivity software applications and corresponding databases 106.

In accordance with an embodiment, an extract process 108 can extract the data, whereupon extraction the data pipeline or process can insert extracted data into a data staging area, which can act as a temporary staging area for the extracted data. When the extract process has completed its extraction, the data transformation layer can be used to transform the extracted data into a model format to be loaded into the customer schema of the data warehouse. During the data transformation, the system can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers may have different requirements with regard to how their data is classified, aggregated, or transformed, for providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a customer may perform modifications to their data source model, to support their particular requirements, for example by adding custom facts or dimensions associated with the data stored in their data warehouse instance; and the system can extend the semantic model accordingly. A semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, the presentation layer can enable access to the data content using, for example, a software analytic application, user interface, analytics dashboard, key performance indicators (KPI's); or other type of report or interface as may be provided by products such as, for example, Oracle Analytics Cloud, or Oracle Analytics for Applications.

In accordance with an embodiment, a query engine 18 (e.g., an Oracle Business Intelligence Server, OBIS instance) operates in the manner of a federated query engine to serve analytical queries or requests from clients directed to data stored at a database. The query engine can push down operations to supported databases, in accordance with a query execution plan 56, wherein a logical query can include Structured Query Language (SQL) statements received from the clients; while a physical query includes database-specific statements that the query engine sends to the database to retrieve data when processing the logical query.

In accordance with an embodiment, a user/developer can interact with a client computer device 10 that includes a computer hardware 11 (e.g., processor, storage, memory), user interface 12, and client application 14. A query engine or business intelligence server generally operates to process inbound, e.g., SQL, requests against a database model, build and execute one or more physical database queries, process the data appropriately, and return the data in response to the request.

To accomplish this, in accordance with an embodiment, the query engine can include a logical or business model, or metadata, that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, the query engine may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine can process queries against a database according to a query execution plan. During operation the query engine can create a query execution plan which can then be further optimized, for example to perform aggregations of data necessary to respond to a request. Data can be combined together and further calculations applied, before the results are returned to the calling application.

In accordance with an embodiment, a request for data analytics or visualization information can be received via a client application and user interface as described above, and communicated to the data analytics environment (in the example of a cloud environment, via a cloud service). The system can retrieve an appropriate dataset to address the user/business context, for use in generating and returning the requested data analytics or visualization information to the client, as a data visualization 196.

In accordance with an embodiment, a client application can be implemented as software or computer-readable program code executable by a computer system or processing device, and having a user interface, such as, for example, a software application user interface or a web browser interface. The client application can retrieve or access data via an Internet/HTTP or other type of network connection to the data analytics environment, or in the example of a cloud environment via a cloud service provided by the environment.

Figure 4:
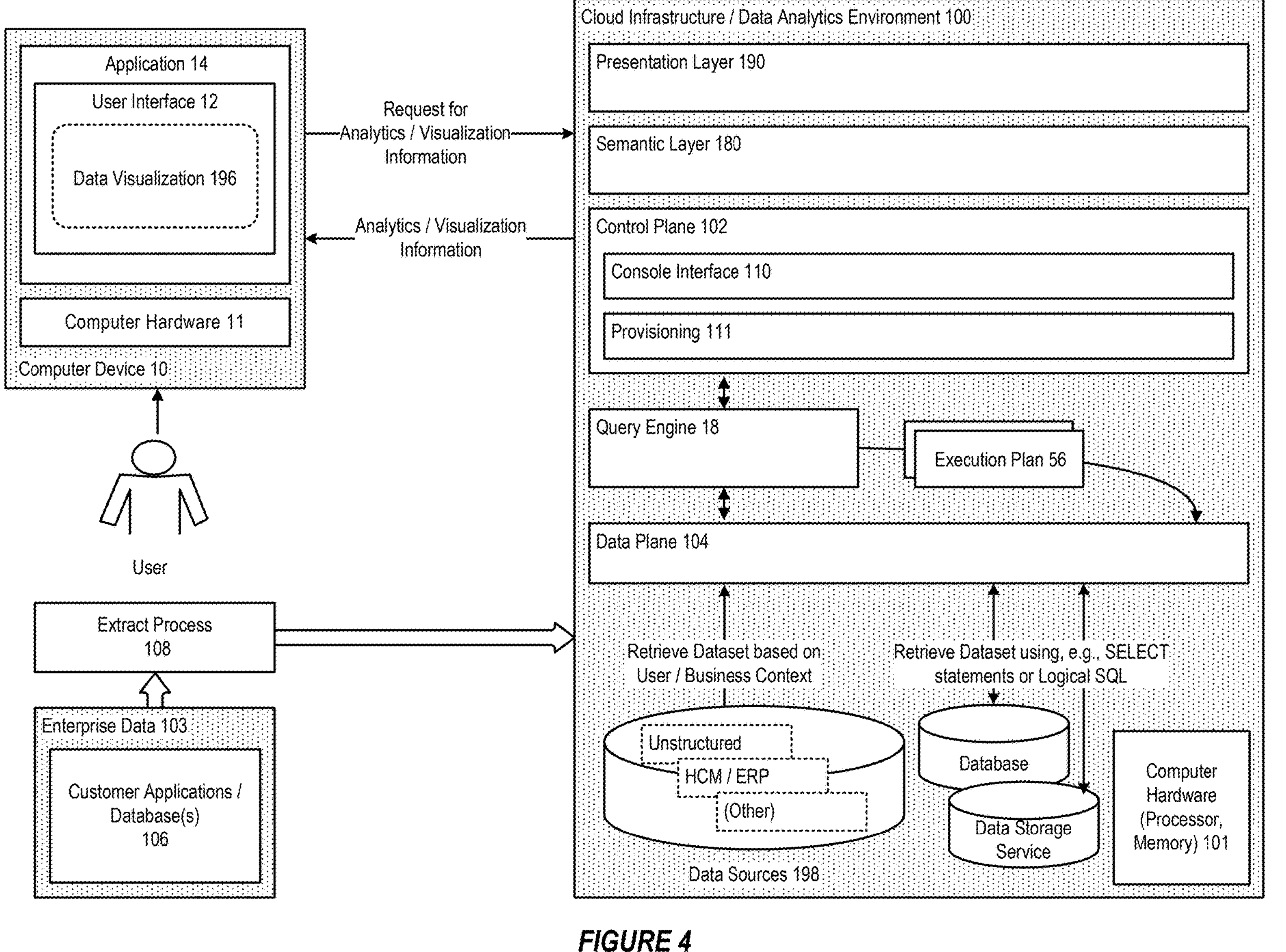
FIG. 4 further illustrates an example data analytics environment, in accordance with an embodiment.

FIG. 4 further illustrates an example data analytics environment, in accordance with an embodiment.

As illustrated in FIG. 4, in accordance with an embodiment, the data analytics environment enables a dataset to be retrieved, received, or prepared from one or more data source(s) 198, for example via one or more data source connections. Examples of the types of data that can be transformed, analyzed, or visualized using the systems and methods described herein include data directed to Enterprise Resource Planning (ERP), Human Capital Management (HCM), or Human Resources (HR), or other types of data provided at one or more of a database, data storage service, or other type of data repository or data source.

For example, in accordance with an embodiment, a request for data analytics or visualization information can be received via a client application and user interface as described above, and communicated to the data analytics environment, for example via a cloud service. The system can retrieve an appropriate dataset to address the user/business context, for use in generating and returning the requested data analytics or visualization information to the client.

Figure 5:
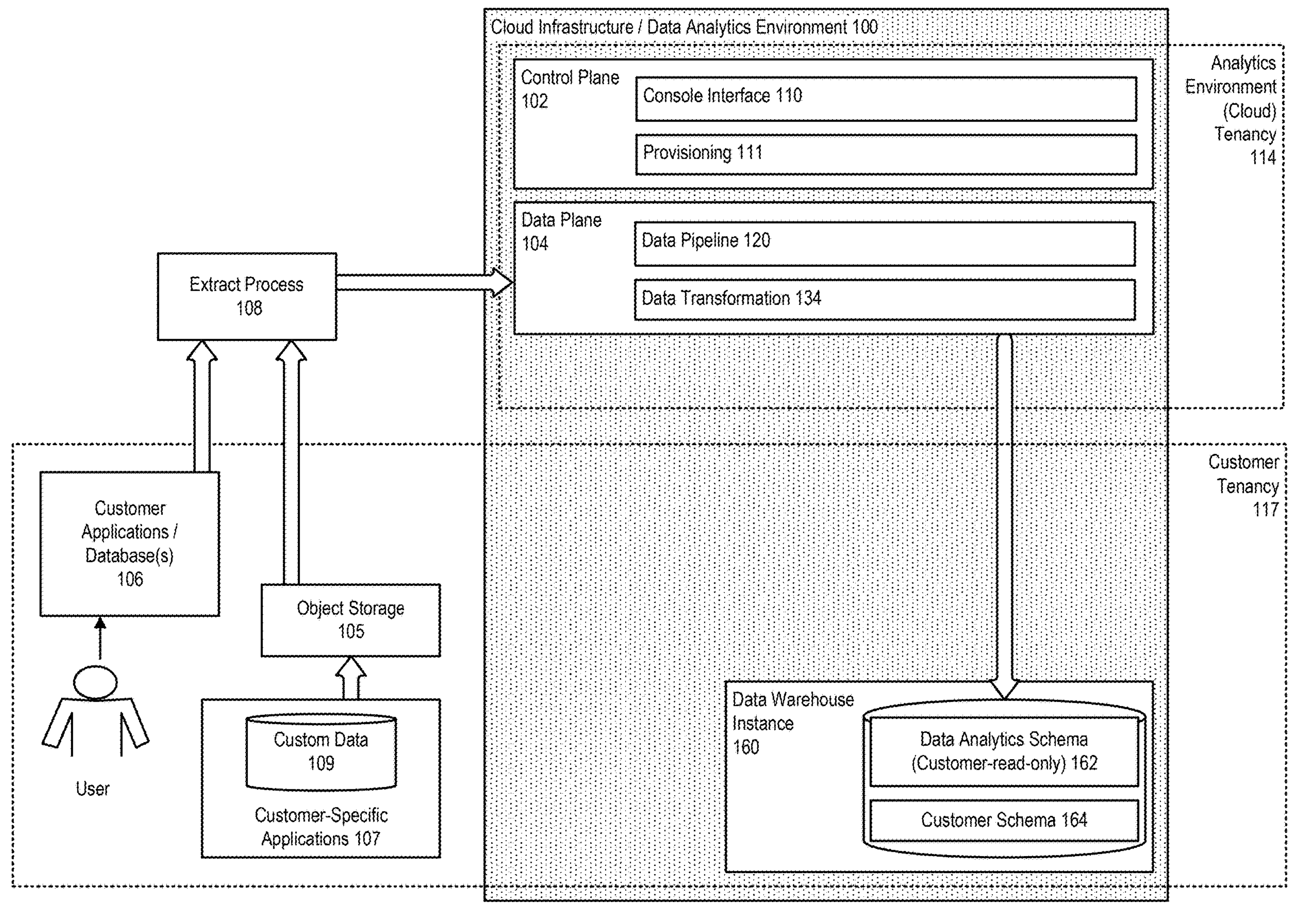
FIG. 5 further illustrates an example data analytics environment, in accordance with an embodiment.

FIG. 5 further illustrates an example data analytics environment, in accordance with an embodiment.

As illustrated in FIG. 5, in accordance with an embodiment, data can be sourced, e.g., from a customer's (tenant's) enterprise software environment (106), using the data pipeline process; or as custom data 109 sourced from one or more customer-specific applications 107; and loaded to a data warehouse instance, including in some examples the use of an object storage 105 for storage of the data. A user can create a dataset that uses tables from different connections and schemas. The system uses the relationships defined between these tables to create relationships or joins in the dataset.

In accordance with an embodiment, the data warehouse can include a default data analytics schema 162 and, for each customer (tenant) of the system, a customer schema 164. For each customer (tenant), the system uses the data analytics schema that is maintained and updated by the system, within a system/cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse can include a data analytics schema and, for each customer/tenant, a customer schema sourced from their enterprise software environment. The data provisioned in a data warehouse tenancy is accessible only to that tenant; while at the same time allowing access to various, e.g., ETL-related or other features of the shared environment.

In accordance with an embodiment, for a particular customer/tenant, upon extraction of their data, the data pipeline or process can insert the extracted data into a data staging area for the tenant, which can act as a temporary staging area for the extracted data. When the extract process has completed its extraction, the data transformation layer can be used to transform the extracted data into a model format to be loaded into the customer schema of the data warehouse.

Figure 6:
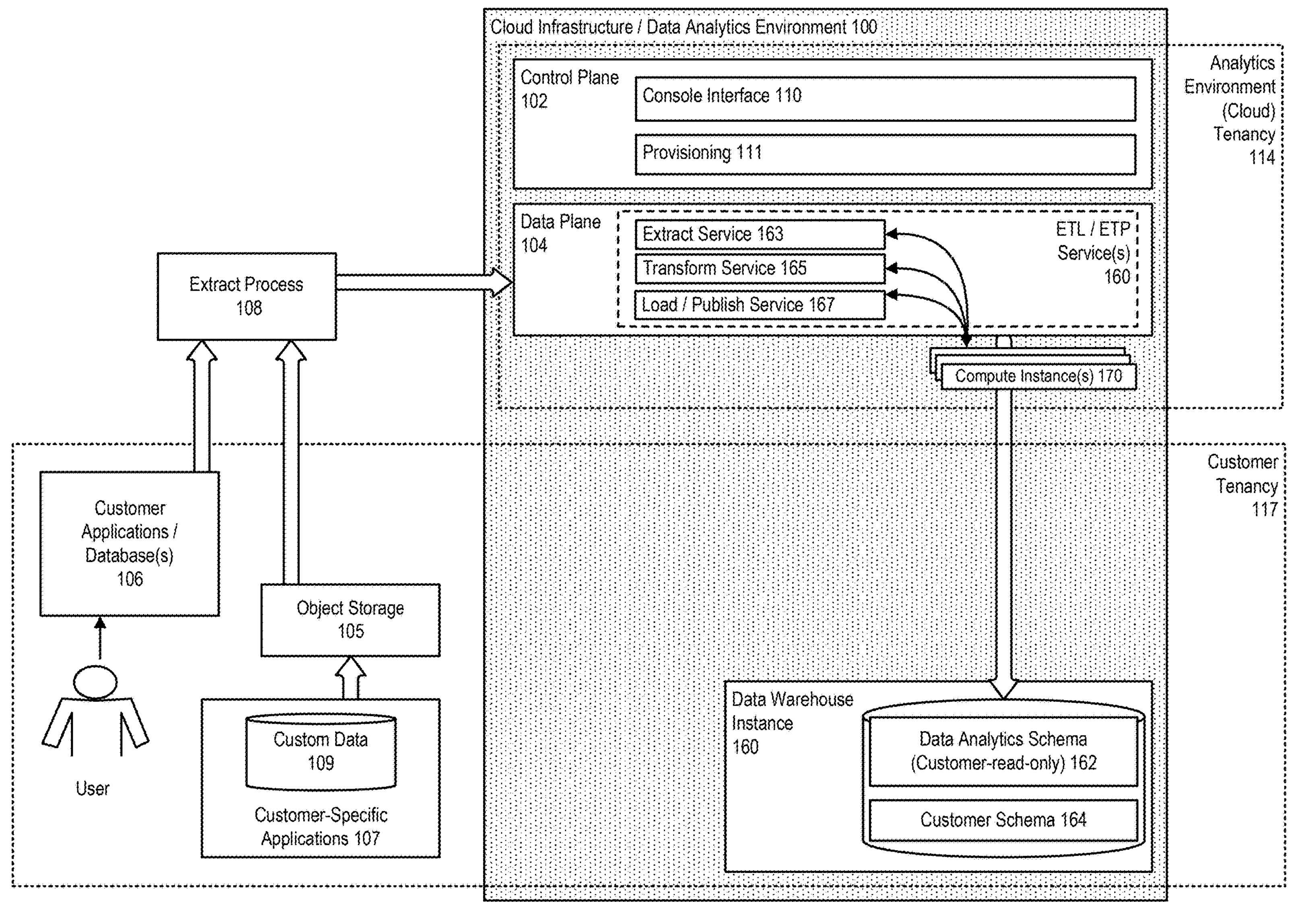
FIG. 6 further illustrates an example data analytics environment, in accordance with an embodiment.

FIG. 6 further illustrates an example data analytics environment, in accordance with an embodiment.

As illustrated in FIG. 6, in accordance with an embodiment, the process of extracting data from a customer's (tenant's) enterprise software environment, and loading the data to a data warehouse instance, or refreshing the data in a data warehouse, generally involves several stages, performed by an ETP service 160 or process, including one or more extraction service 163; transformation service 165; and load/publish service 167, executed by one or more compute instance(s) 170.

For example, in accordance with an embodiment, extracted files can be uploaded to an object storage component for storage of the data. The transformation process then applies a business logic while loading them to a target data warehouse, e.g., an Autonomous Data Warehouse (ADW) database, which is internal to the data pipeline or process, and is not exposed to the customer (tenant). A load/publish service or process takes the data from the ADW database and publishes it to a data warehouse instance that is accessible to the customer (tenant).

Figure 7:
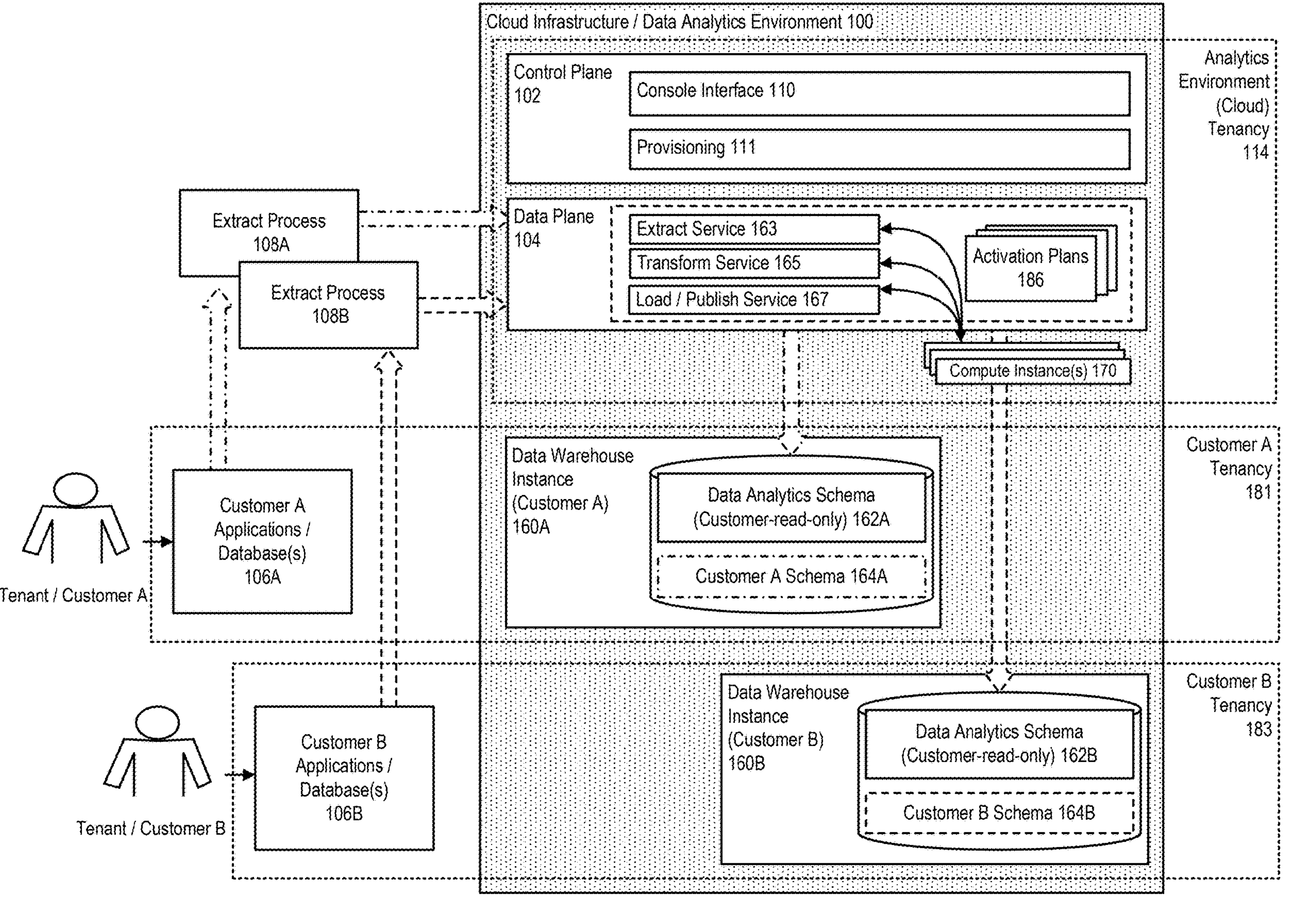
FIG. 7 further illustrates an example data analytics environment, in accordance with an embodiment.

FIG. 7 further illustrates an example data analytics environment, in accordance with an embodiment.

As illustrated in FIG. 7, in accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case. For each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs. For example, an activation plan can define a number of extract, transform, and load (publish) services or steps to be run in a certain order, at a certain time of day, and within a certain window of time.

Figure 8:
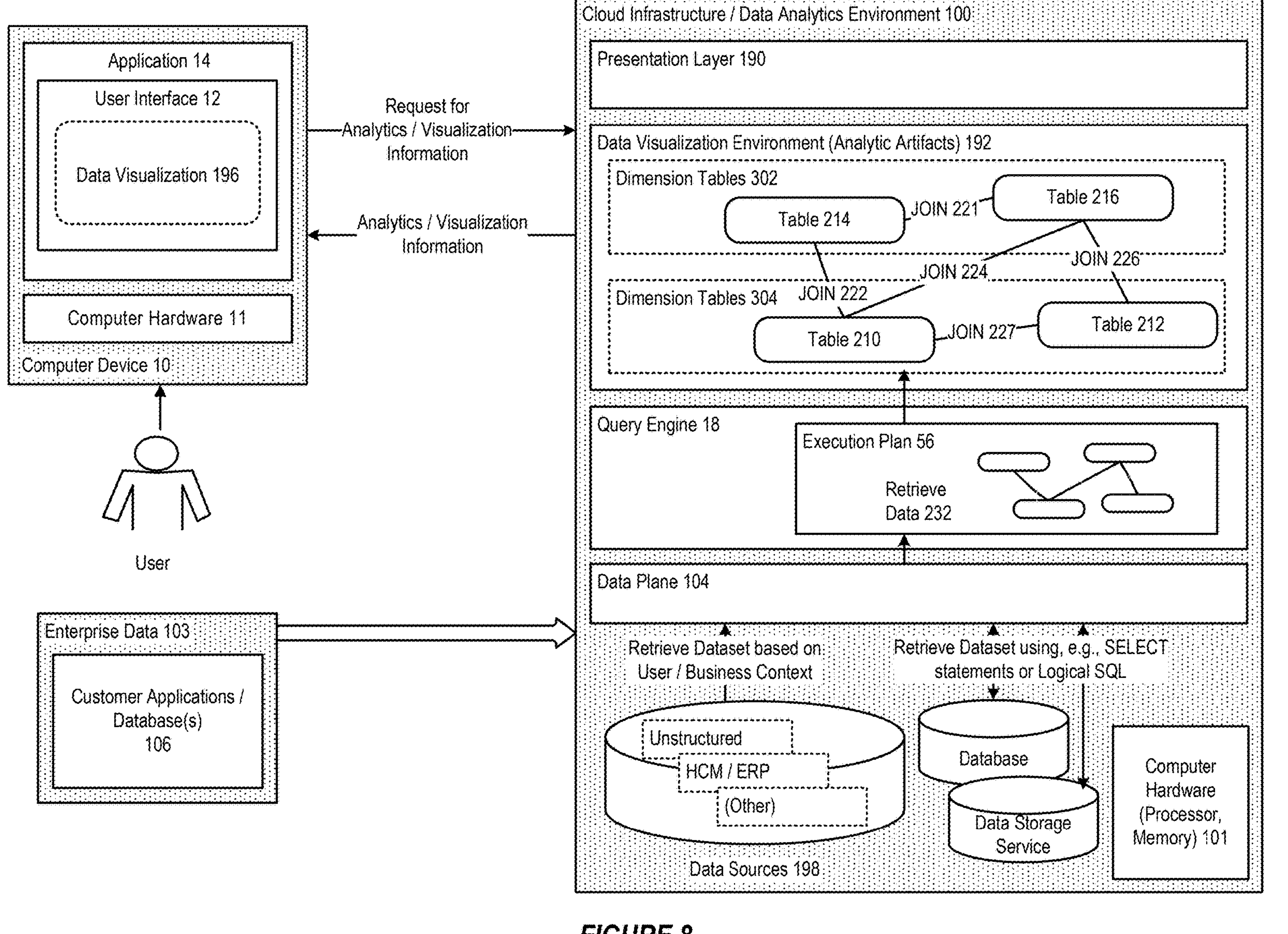
FIG. 8 further illustrates an example data analytics environment, in accordance with an embodiment.

FIG. 8 further illustrates an example data analytics environment, in accordance with an embodiment.

Generally described, within a database or data warehouse, the data of interest may be spread across multiple tables. In such environments, joins can be used to stitch the data from various tables together, to better prepare the data for analysis.

For example, as illustrated in FIG. 8, in accordance with an embodiment, the data analytics environment enables a dataset to be retrieved, received, or prepared from one or more data source(s), for example via one or more data source connections, fact and/or dimension tables 210-216, or joins 221-227 between selections of dimension tables 302, 304.

In accordance with an embodiment, a request received at a data visualization environment to display analytic artifacts 192, for example as may be related to key performance indicators, analytics dashboards, or scorecards, can be received via a client application and user interface as described above, and communicated to the data analytics environment via a cloud service. The system can retrieve 232 an appropriate dataset using, e.g., SELECT statements, to address the user/business context, for use in generating and returning the requested data analytics or visualization information to the client.

Large Language Models (LLM)

Figure 9:
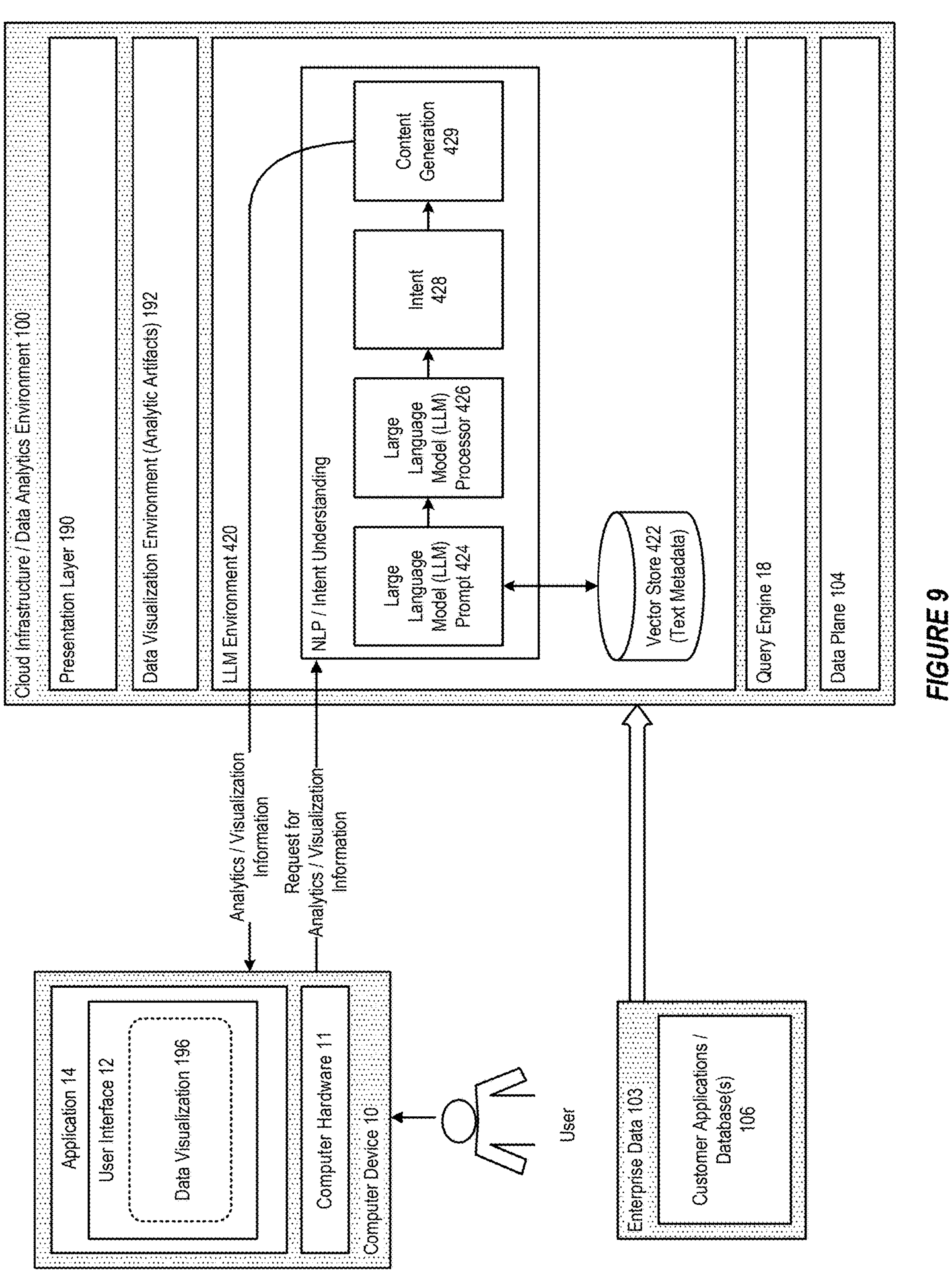
FIG. 9 further illustrates an example data analytics environment, including the use of a large language model, in accordance with an embodiment.

FIG. 9 further illustrates an example data analytics environment, including the use of a large language model, in accordance with an embodiment.

As illustrated in FIG. 9, in accordance with an embodiment, a data analytics system can include a large language model (LLM) environment 420. A vector database 422 provides storage and retrieval of vectors or vector embeddings, which in turn enables LLMs to understand information with increased context and accuracy, for example in generating a requested data analytics information or data visualization.

In accordance with an embodiment, the system can parse a user query or natural language input, infer an intent 428 based on one or more large language model (LLM) prompt 424 or LLM processor 426, and then determine, for example, which subject areas may be relevant to the inferred intent, and generate or return an appropriate content 429.

Enrichment Utilizing External Data and Large Language Model

In accordance with an embodiment, the systems and methods described herein can utilize a large language model (LLM) to analyze a dataset, e.g., column header names of a dataset, which can be in a standard written language (e.g., English), or an abbreviated version thereof.

The dataset, such as a graph, chart, or other data provided can be analyzed by the LLM to suggest, based on the LLM's inherent knowledge, factors that might explain the data in question.

Based on those factor names, a web search can then be automatically conducted to find such an available dataset, and the data is then scraped, with the assistance of an LLM. Finding the factor (and ideally cause) that best explains metrics in a user's dataset is a component of the systems and methods, even if said factor/causes are not present in the user's dataset.

In accordance with an embodiment, the systems and methods can provide users with another data explanation tool (in addition to the other pre-existing means—except those all depend solely on the user's own data).

In accordance with an embodiment, the systems and methods can utilize a high-powered LLM to suggest data-related factors that may not be explicitly represented in the user's dataset. For example, upon a user's selection of a pair of datapoints, the systems and methods can utilize a LLM to provide suggestions for root causes of those datapoints, even though such root causes are not explicitly represented in the dataset.

In accordance with an embodiment, the system and methods can utilize various LLMs, from less powerful LLMs (less expensive, slower), medium-powered LLMs (less expensive, faster), or high-powered LLMs (more expensive, faster) to describe why each factor identified/selected might explain the user's data.

In accordance with an embodiment, the system and methods can utilize a LLM (e.g., medium-powered) in a processing data flow to assist in parsing large files, such as large web HTML files (that are too large for the context window of most LLMs to handle all at once). Such a processing data flow can comprise, for example: chunking a file, such as an HTML file, to pieces of manageable size and iterating through the chunks with LLM, using the LLM to generate summaries for each found table (e.g., HTML table), using the LLM to select the most suitable table (e.g., HTML table) based on the summaries generated by the LLM, and using the LLM to select the most suitable columns from the most suitable table (e.g., HTML table).

In accordance with an embodiment, the systems and methods can utilize a LLM (e.g., medium-powered) to evaluate the confidence (High, Medium, Low) of the factors identified and listed from the first step. The identified potential factors can be presented via a user interface, for example, via a confidence score being color coded, as plain language, and/or presenting a domain name of the website where such data was located.

Figure 10:
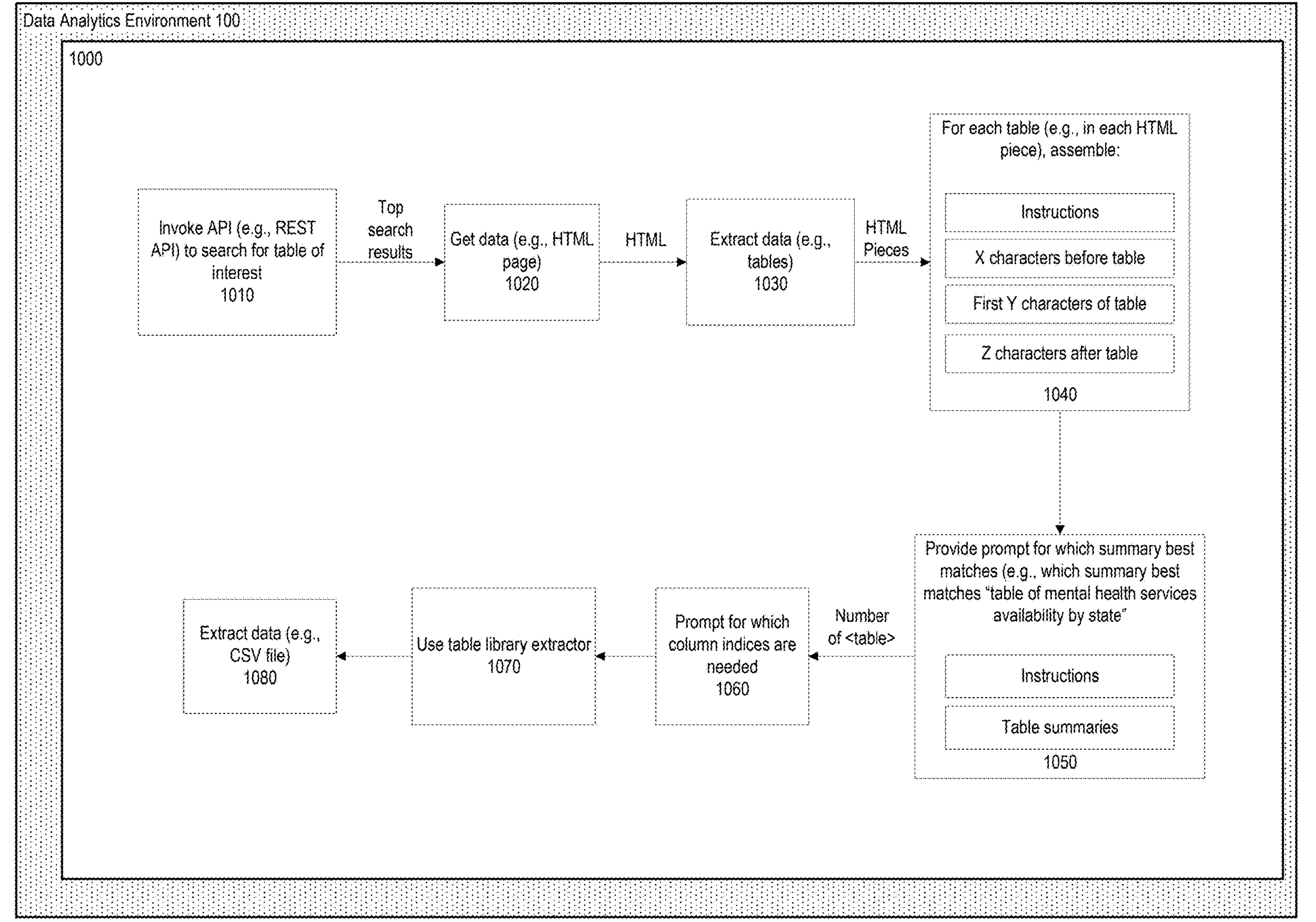
FIG. 10 illustrates a system for enrichment of data from external sources via a large language model, in accordance with an embodiment.

FIG. 10 illustrates a flow chart of a method for enrichment of data from external sources via a large language model, in accordance with an embodiment.

In accordance with an embodiment, a flow 1000 for enrichment of data from external sources via a LLM is illustrated in FIG. 10. A user of a dataset can, at 1010 invoke an API, such as a REST API, to search for key words/column headings of the dataset, such as “table of mental employment services availability by state”. A search can be performed (e.g., a web search or a search of a user’s available and accessible data on a private network), and top search results can be received, and the data can be harvested at 1020 (e.g., via an HTML page). The flow can continue at 1030, where the data, such as the tables within the HTML, can be extracted. At 1040, for each table extracted, data can be assembled, including instructions, X characters before a table, Y characters of a table, and Z characters after a table. In accordance with an embodiment, the number of characters X, Y, and Z can comprise default numbers or can be customized via a user input. For example, in one embodiment, the systems and methods can extract 1000 characters before a table, the first 2000 characters of a table, and 1000 characters after a table.

In accordance with an embodiment, a summary of each table can be prepared, and then at 1050, a prompt for which summary best matches the keywords/column headings can be presented. A selected table can then prompt for which column indices are useful/needed at 1060, and then data can be extracted to a usable format at 1070, such as a comma separated from variable format 1080.

In accordance with an embodiment, the systems and methods can support scraping of websites in any number of formats, such as portable document format (PDF), .xls, .xlsx, .csv . . . etc. In essence, everything on a page can be scraped, and then the systems and methods can determine which factor has a best correlation.

In accordance with an embodiment, for example, a dataset with the following columns can been loaded:

State
Number of homeless
Population
Homelessness Rate
Below Poverty Line
Poverty Rate
Unemployed In accordance with an embodiment, from the dataset, a scatter plot can be rendered with the following slots:

X-Axis: Homelessness Rate
Y-Axis: Poverty Rate
Color: Unemployed
Size: Population
Labels: State In accordance with an embodiment, a question can be posed by a user—“What external factors could explain why Nebraska and Oklahoma have different values for the two main axes?”

In accordance with an embodiment, the systems and methods can provide an answer, e.g., in the form of a list (e.g., a JSON list) of short quoted strings of the proposed column names, sorted by decreasing likelihood to explain the different scatter plot values. The systems and methods can include factors that are either a metric or an objectively-defined set of categories. The systems and methods may not include vague or subjective descriptions that include words such as “factors”, “policies”, “demographics”, or “attitude”; they can include only specific singular factors for which data sources could be found (e.g., on the Internet or other accessible sources of data) that list for each State that particular factor. The systems and methods may not include any description in the answer and can provide only an array (e.g., JSON array).

In accordance with an embodiment, only the column header names are submitted to the LLM.

In accordance with an embodiment, the query can comprise a number of pieces of the dataset that can be extracted to form the query. This includes the columns (e.g., state, population . . . etc.), the grammar (e.g., X-Axis: Homelessness Rate, Size: Population . . . etc.), the names of the data points in question (e.g., Nebraska and Oklahoma), the chart type (e.g., scatter plot), and the grammar label slot (e.g., State).

Figure 11:
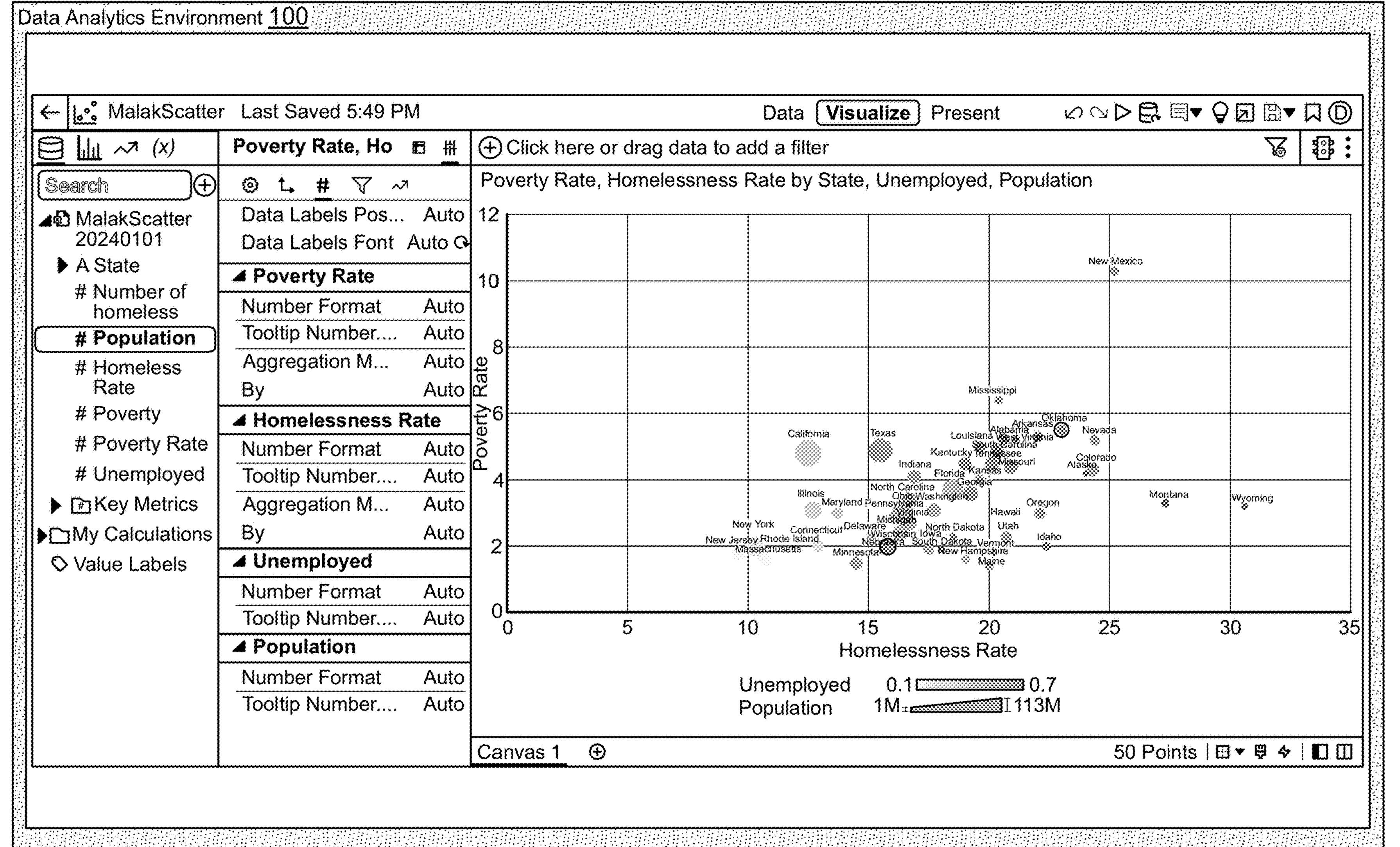
FIG. 11 is an exemplary screenshot of a method for enrichment of data from external sources via a large language model, in accordance with an embodiment.

FIG. 11 is an exemplary screenshot of a method for enrichment of data from external sources via a large language model, in accordance with an embodiment.

In accordance with an embodiment, the screenshot of FIG. 11 shows a generated scatter plot based in conjunction with the above-described example. Shown in the screenshot are the selection of the points of interest.

Figure 12:
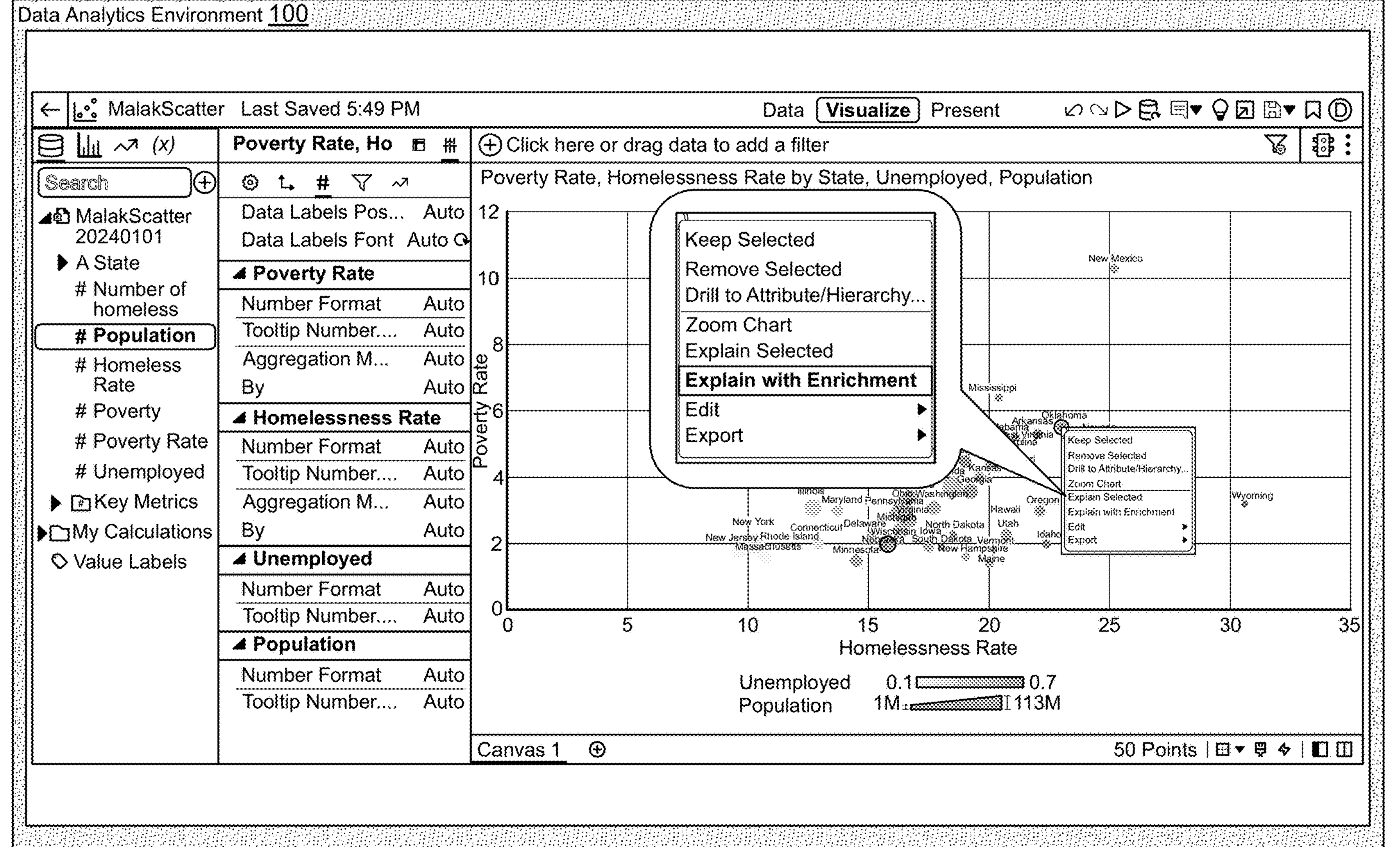
FIG. 12 is an exemplary screenshot of a method for enrichment of data from external sources via a large language model, in accordance with an embodiment.

FIG. 12 is an exemplary screenshot of a method for enrichment of data from external sources via a large language model, in accordance with an embodiment.

In accordance with an embodiment, the screenshot of FIG. 12 shows a generated scatter plot based in conjunction with the above-described example. Shown in the screenshot is an initiation of the method for enrichment of data from external sources via a LLM.

Figure 13:
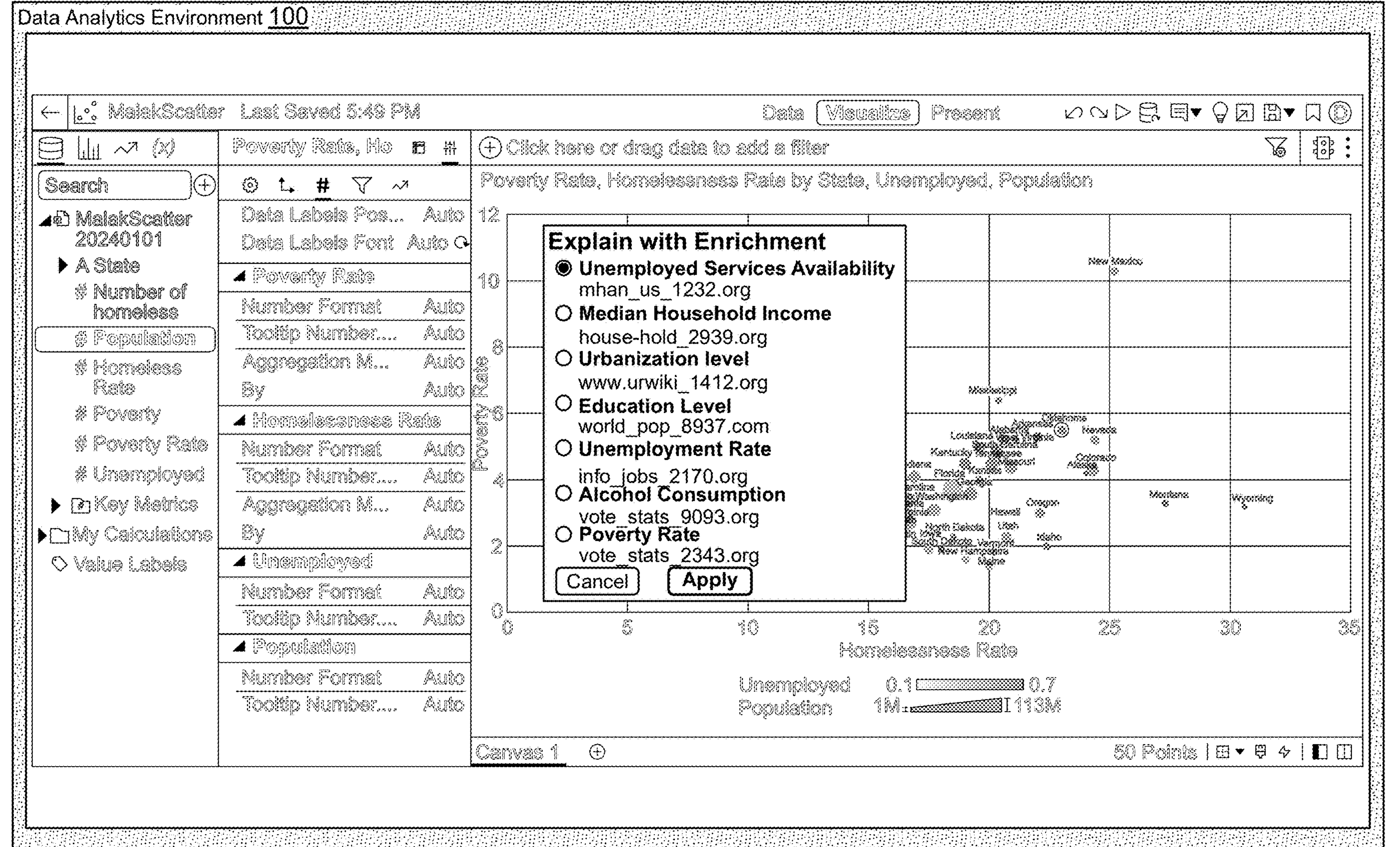
FIG. 13 is an exemplary screenshot of a method for enrichment of data from external sources via a large language model, in accordance with an embodiment.

FIG. 13 is an exemplary screenshot of a method for enrichment of data from external sources via a large language model, in accordance with an embodiment.

In accordance with an embodiment, the screenshot of FIG. 13 shows a generated scatter plot based in conjunction with the above-described example. Shown in the screenshot are a listing of external sources of data discovered by the method for enriching the data from external sources ranked in a descending score order.

Figure 14:
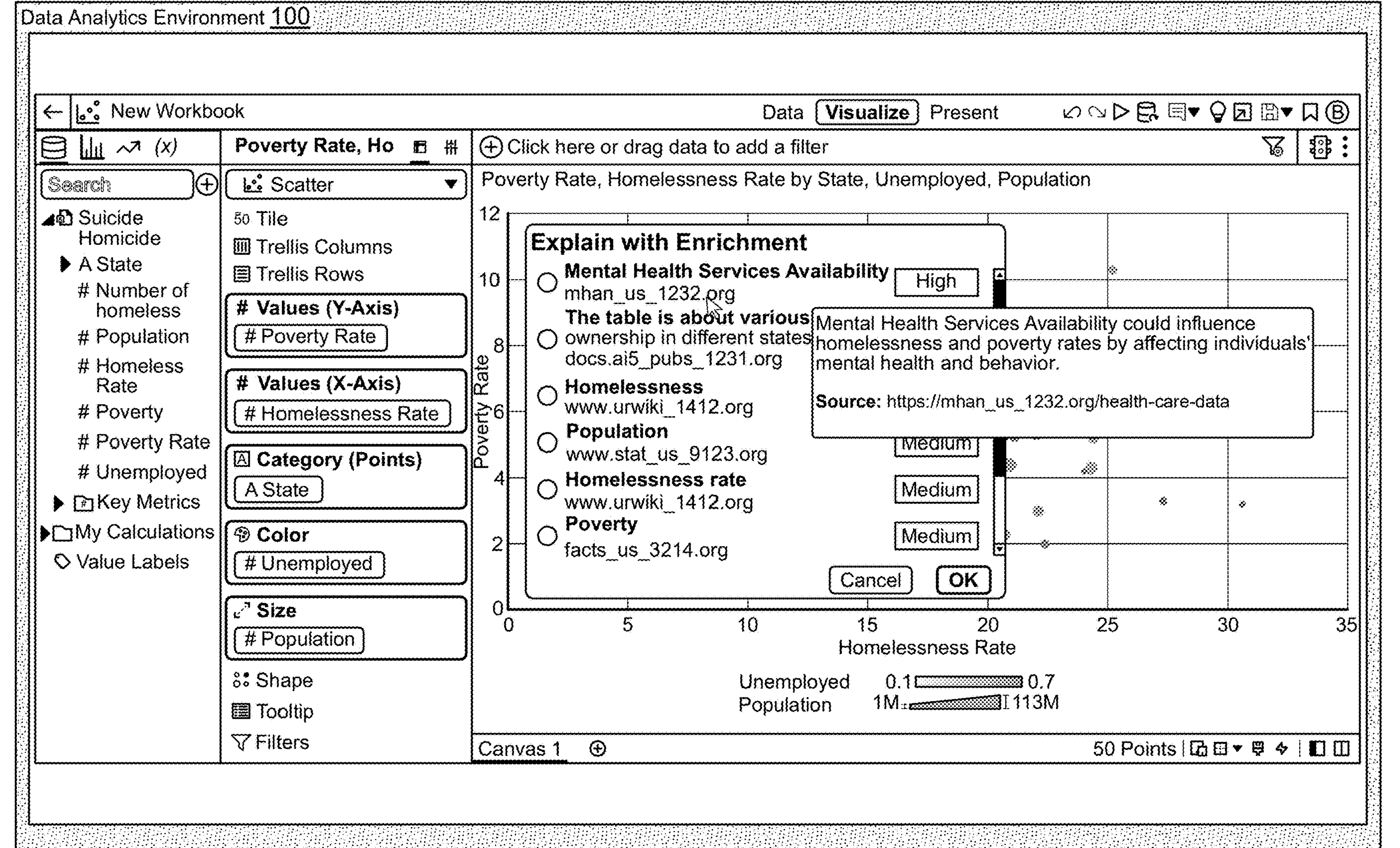
FIG. 14 is an exemplary screenshot of a method for enrichment of data from external sources via a large language model, in accordance with an embodiment.

FIG. 14 is an exemplary screenshot of a method for enrichment of data from external sources via a large language model, in accordance with an embodiment.

In accordance with an embodiment, the screenshot of FIG. 14 shows a generated scatter plot based in conjunction with the above-described example. Shown in the screenshot are a listing of external sources of data discovered by the method for enriching the data from external sources, discovered using an LLM, ranked in a descending score order together with color-coded indications of score showing a high correspondence to a medium correspondence. As well, a selection of an external data source can display a link to the source of the external data.

Figure 15:
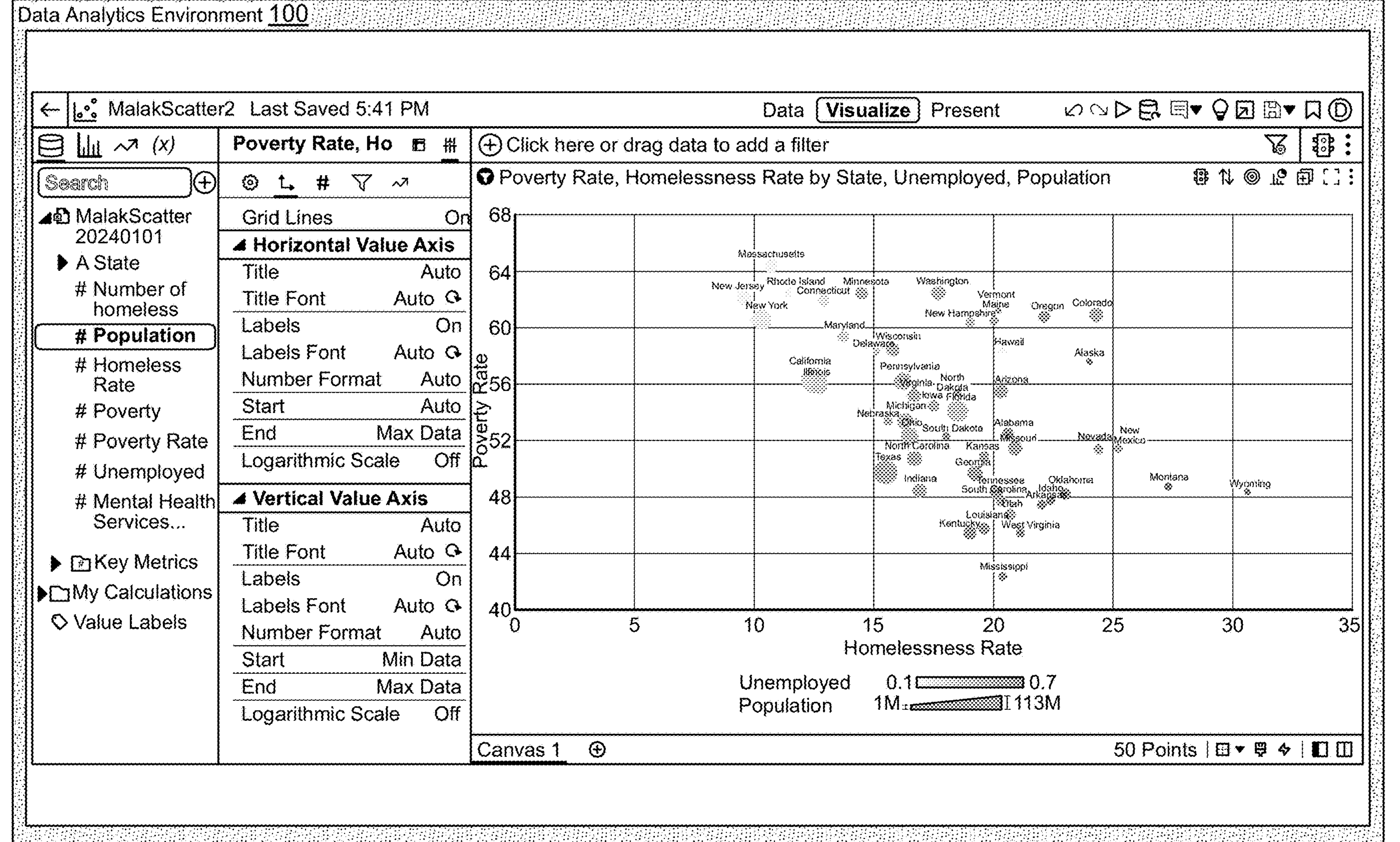
FIG. 15 is an exemplary screenshot of a method for enrichment of data from external sources via a large language model, in accordance with an embodiment.

FIG. 15 is an exemplary screenshot of a method for enrichment of data from external sources via a large language model, in accordance with an embodiment.

In accordance with an embodiment, the screenshot of FIG. 15 shows a generated scatter plot based in conjunction with the above-described example. Shown in the screenshot is a new scatter plot that has been enriched with data scrapped from an external source using an LLM.

Figure 16:
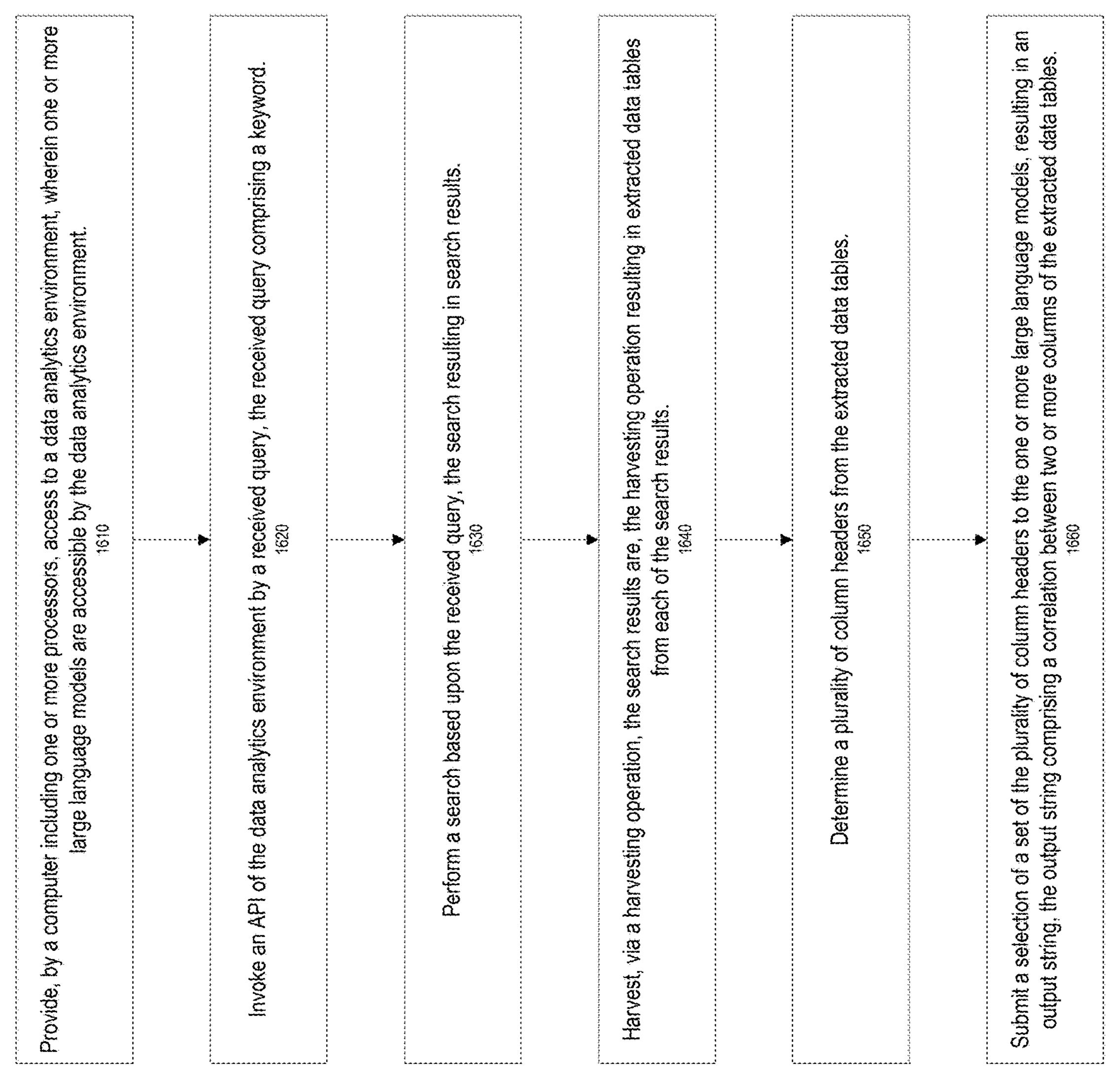
FIG. 16 is a flowchart of an exemplary method for use with a data analytics environment to provide enrichment of data from external sources via a large language model, in accordance with an embodiment.

FIG. 16 is a flowchart of an exemplary method for use with a data analytics environment to provide enrichment of data from external sources via a large language model, in accordance with an embodiment.

In accordance with an embodiment, at step 1610, the method can provide, by a computer including one or more processors, access to a data analytics environment, wherein one or more large language models are accessible by the data analytics environment.

In accordance with an embodiment, at step 1620, the method can invoke an API of the data analytics environment by a received query, the received query comprising a keyword.

In accordance with an embodiment, at step 1630, the method can perform a search based upon the received query, the search resulting in search results.

In accordance with an embodiment, at step 1640, the method can harvest, via a harvesting operation, the search results are, the harvesting operation resulting in extracted data tables from each of the search results.

In accordance with an embodiment, at step 1650, the method can determine a plurality of column headers from the extracted data tables.

In accordance with an embodiment, at step 1660, the method can submit a selection of a set of the plurality of column headers to the one or more large language models, resulting in an output string, the output string comprising a correlation between two or more columns of the extracted data tables.

In accordance with an embodiment, the performed search can be directed to sources of data external to the computer.

In accordance with an embodiment, the harvesting operation can further result in extracting a first amount of character data preceding each of the extracted data tables, extracting a second amount of character data within each of the extract data tables, and extracting a third amount of character data following each of the extracted data tables.

In accordance with an embodiment, the harvesting operation can utilize a medium powered large language model of the one or more large language models, the harvesting operation comprising: chunking each of the search results into smaller files, iterating through each of the smaller files to identify the data tables, generating, via the medium powered LLM, summaries for each of the identified data tables, and identifying, via the medium powered LLM, a set of the identified data tables as being most suitable in relation to the received query based upon the generated summaries for each of the identified data tables.

In accordance with an embodiment, the harvesting operation further can further include selecting, via the medium powered LLM, relevant columns of from the set of identified data tables.

In accordance with an embodiment, the data analytics environment can generate for one or more views for display, the one or more views comprising the output string.

In accordance with an embodiment, the harvesting operation can support a plurality of data formats.

In accordance with various embodiments, the systems and methods described herein can be implemented using one or more computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with cloud environments such as Oracle Analytics Cloud; in accordance with various embodiments, the systems and methods described herein can be used with other types of enterprise software applications, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with a data analytics environment to provide enrichment of data from external sources via a large language model, comprising:

- a computer including one or more processors, that provides access to a data analytics environment;
- wherein one or more large language models are accessible by the data analytics environment;
- wherein an API of the data analytics environment is invoked by a received query, the received query comprising a keyword;
- wherein a search is performed based upon the received query, the search resulting in search results;
- wherein the search results are subjected to a harvesting operation, wherein the harvesting operation utilizes a large language model of the one or more large language models, the harvesting operation comprising:
  - chunking each of the search results into smaller files;
  - iterating through each of the smaller files to identify data tables therein;
  - generating, via the large language model, summaries for each of the identified data tables; and
  - identifying, via the large language model, a set of the identified data tables as being most suitable in relation to the received query based upon the generated summaries for each of the identified data tables;
  - the harvesting operation resulting in extracted data tables from each of the search results;
- wherein a plurality of column headers from the extracted data tables are determined; and
- wherein a selection of a set of the plurality of column headers are submitted to the one or more large language models, resulting in an output string, the output string comprising a correlation between two or more columns of the extracted data tables.

2. The system of claim 1, wherein the performed search is directed to sources of data external to the computer.

3. The system of claim 2, wherein the harvesting operation further results in extracting a first amount of character data preceding each of the extracted data tables, extracting a second amount of character data within each of the extract data tables, and extracting a third amount of character data following each of the extracted data tables.

4. The system of claim 1, wherein the harvesting operation utilizes a medium powered large language model of the one or more large language models.

5. The system of claim 4, wherein the harvesting operation further comprises:

- selecting, via the medium powered LLM, relevant columns of from the set of identified data tables.

6. The system of claim 5, wherein the data analytics environment generates one or more views for display, the one or more views comprising the output string.

7. The system of claim 5, wherein the harvesting operation supports a plurality of data formats.

8. A method for use with a data analytics environment to provide enrichment of data from external sources via a large language model, comprising:

providing, by a computer including one or more processors, access to a data analytics environment, wherein one or more large language models are accessible by the data analytics environment;

invoking an API of the data analytics environment by a received query, the received query comprising a keyword;

performing a search based upon the received query, the search resulting in search results;

harvesting, via a harvesting operation, the search results, wherein the harvesting operation utilizes a large language model of the one or more large language models, the harvesting operation comprising:

chunking each of the search results into smaller files;

iterating through each of the smaller files to identify data tables therein;

generating, via the large language model, summaries for each of the identified data tables; and identifying, via the large language model, a set of the identified data tables as being most suitable in relation to the received query based upon the generated summaries for each of the identified data tables;

the harvesting operation resulting in extracted data tables from each of the search results;

determining a plurality of column headers from the extracted data tables; and submitting a selection of a set of the plurality of column headers to the one or more large language models, resulting in an output string, the output string comprising a correlation between two or more columns of the extracted data tables.

9. The method of claim 8, wherein the performed search is directed to sources of data external to the computer.

10. The method of claim 9, wherein the harvesting operation further results in extracting a first amount of character data preceding each of the extracted data tables, extracting a second amount of character data within each of the extract data tables, and extracting a third amount of character data following each of the extracted data tables.

11. The method of claim 8, wherein the harvesting operation utilizes a medium powered large language model of the one or more large language models.

12. The method of claim 11, wherein the harvesting operation further comprises:

selecting, via the medium powered LLM, relevant columns of from the set of identified data tables.

13. The method of claim 12, wherein the data analytics environment generates one or more views for display, the one or more views comprising the output string.

14. The method of claim 13, wherein the harvesting operation supports a plurality of data formats.

15. A non-transitory computer readable storage medium having instructions thereon for use with a data analytics environment to provide enrichment of data from external sources via a large language model, which when read and executed cause a computer to perform steps comprising:

providing, by the computer, the computer including one or more processors, access to a data analytics environment, wherein one or more large language models are accessible by the data analytics environment;

invoking an API of the data analytics environment by a received query, the received query comprising a keyword;

performing a search based upon the received query, the search resulting in search results;

harvesting, via a harvesting operation, the search results, wherein the harvesting operation utilizes a large language model of the one or more large language models, the harvesting operation comprising:

chunking each of the search results into smaller files;

iterating through each of the smaller files to identify data tables therein;

generating, via the large language model, summaries for each of the identified data tables; and identifying, via the large language model, a set of the identified data tables as being most suitable in relation to the received query based upon the generated summaries for each of the identified data tables;

the harvesting operation resulting in extracted data tables from each of the search results;

determining a plurality of column headers from the extracted data tables; and submitting a selection of a set of the plurality of column headers to the one or more large language models, resulting in an output string, the output string comprising a correlation between two or more columns of the extracted data tables.

16. The non-transitory computer readable storage medium of claim 15, wherein the performed search is directed to sources of data external to the computer.

17. The non-transitory computer readable storage medium of claim 16, wherein the harvesting operation further results in extracting a first amount of character data preceding each of the extracted data tables, extracting a second amount of character data within each of the extract data tables, and extracting a third amount of character data following each of the extracted data tables.

18. The non-transitory computer readable storage medium of claim 15, wherein the harvesting operation utilizes a medium powered large language model of the one or more large language models.

19. The non-transitory computer readable storage medium of claim 18, wherein the harvesting operation further comprises:

selecting, via the medium powered LLM, relevant columns of from the set of identified data tables.

20. The non-transitory computer readable storage medium of claim 19, wherein the data analytics environment generates one or more views for display, the one or more views comprising the output string.

* * * * *